United States Patent [19]

Saito

[11] Patent Number: 5,508,502

[45] Date of Patent: Apr. 16, 1996

[54] INFORMATION RECORDING/REGENERATING METHOD AND INFORMATION MANAGEMENT SYSTEM CAPABLE OF MANAGING A PLURALITY OF ITEMS OF INFORMATION EFFICIENTLY

[75] Inventor: Akito Saito, Hino, Japan

[73] Assignee: Olympus Optical Co., Ltd., Tokyo, Japan

[21] Appl. No.: 65,073

[22] Filed: May 24, 1993

[30] Foreign Application Priority Data

May 29, 1992 [JP] Japan .................................... 4-139051

[51] Int. Cl.$^6$ .................................................. G06K 7/10
[52] U.S. Cl. .................................... 235/454; 395/427
[58] Field of Search ............................. 235/380, 454, 235/375; 395/600, 425, 934 D; 360/2

[56] References Cited

U.S. PATENT DOCUMENTS

| | | | |
|---|---|---|---|
| 4,827,399 | 5/1989 | Shibayama | 364/600 |
| 4,889,979 | 12/1983 | Drexler et al. | 235/454 |
| 5,204,958 | 4/1993 | Cheng et al. | 395/600 |

FOREIGN PATENT DOCUMENTS

| | | | |
|---|---|---|---|
| 5334852 | 6/1992 | Japan | 360/2 |
| 6162285 | 11/1992 | Japan | 360/2 |

*Primary Examiner*—Donald T. Hajec
*Assistant Examiner*—Thien Minh Le
*Attorney, Agent, or Firm*—Armstrong, Westerman, Hattori, McLeland & Naughton

[57] ABSTRACT

A host computer searches an optical card for a file dated the same year as a screening file for a latest screening, which is to be recorded, at a search step, and determines at a first determination step whether a screening file dated the same year is present. When determining that a screening file dated the same year is present, the host computer extends control to a screening file recording step. When determining that a screening file dated the same year is absent, the host computer extends control to a regenerating step. The host computer then regenerates all screening files, which are dated the year for which no packed file has been created, from the optical card, and then determines at a second determination step whether the number of regenerated screening files exceeds 1. When it is determined that the number of regenerated screening files exceeds 1, control is passed to a packed file recording step. The regenerated screening files are then recorded all together as a packed file on the optical card. Control is then passed to a screening file recording step. When it is determined at the second determination step that the number of regenerated screening files is less than 1, control is passed to the screening file recording step. At the screening file recording step, the latest screening file is recorded on the optical card.

23 Claims, 6 Drawing Sheets

INFORMATION RECORDING/REGENERATING METHOD AND INFORMATION MANAGEMENT SYSTEM CAPABLE OF MANAGING A PLURALITY OF ITEMS OF INFORMATION EFFICIENTLY

BACKGROUND OF THE INVENTION

1. Field of the Invention

The present invention relates to an information recording/regenerating method and an information management system that can record or regenerate information on or from an information recording medium. In particular, this invention is concerned with an information recording/regenerating method and an information management system that can manage a plurality of items of information efficiently.

2. Description of the Related Art

Various information recording media, such as an optical card, a magnetic tape, a magnetic disk, an optical disk, a magneto-optic disk, and an IC card have been employed for recording information.

In recent years, various data bases have been constructed to store enormous information. In the field of health care, for example, an attempt has been made to construct data bases containing the results of screenings undertaken periodically by a municipality. The stored personal information has come to be utilized for various kinds of statistical tabulation or for doctors or public health nurses to give health care advice to residents.

These data bases have been placed in organizations in which health care information is centralized and managed, for example, city halls and health care centers, and recorded in information recording media having relatively large storage capacities, such as magnetic tapes, magnetic disks, optical disks, and magneto-optic disks.

Unless a network permitting online communication over a wide area is completed, the stored information is accessible only in the organizations in which the information is preserved.

With the adoption of an optical card or other information recording medium that has a storage capacity large enough to store the information of an individual and offers excellent portability, the information of individuals is stored in the media and the individuals carry the media. This makes it possible to fully utilize information at multiple organizations.

When a write-once medium such as an optical card is used to record the results of screenings undertaken periodically by a municipality, various methods of management are conceivable in practice. When a write-once medium is concerned, the allocation in recording of previously information recorded cannot be altered. The information of one screening of an individual is recorded additionally as one file.

The information thus stored is the health advice given by used as references in doctors or public health nurse after reviewing the results of past screenings on a time-series basis at a time of physical checkups.

The results of past screenings required for the above purpose are filed by types of screenings and by dates of examinations for each screening. The record positions on a recording medium are separated from one another. A municipality undertakes various periodical screenings every year. For example, a person undergoes six types of periodical screenings including a basic physical checkup, a screening of tuberculosis, a screening of lung cancer, a screening of stomach cancer, a screening of uterine cancer, and a screening of breast cancer. To learn the results of all screenings the person has undergone for the past ten years, the results of the screenings must be read from sixty files recorded on a recording medium.

A period of time is required to carry out a procedure for regenerating each of the sixty information files. Another period of time is required to access a track in which necessary information is recorded. It therefore takes excessive time to regenerate the information.

SUMMARY OF THE INVENTION

An object of the present invention is to provide an information recording/regenerating method and an information management system that can improve the regenerative efficiency per time for regenerating multiple information items.

Another object of the present invention is to provide an information recording/regenerating method and an information management system that can improve the reliability of information regeneration in regenerating multiple items of information.

An information recording/regenerating method of the present invention comprises a first step at which first information items of multiple types acquired within a specified period are recorded on an information recording medium, a second step at which second information items of multiple types, which have been recorded for a specified period except for the previous specified period at the first recording step, are regenerated, a third step at which the second information items regenerated at the second step are recorded as intra-period information on the information recording medium, and a fourth step at which the first information items and the intra-period information are regenerated.

An information management system of the present invention comprises an input means for inputting at least one information item among multiple types of information, a recording means for recording the input information on an information recording medium, a regenerating means for regenerating record information which has been recorded on the recording medium, and a period information recording means that when the record information, which has been recorded on the recording medium, includes multiple items of information, records the record information as intra-period information on the recording medium.

The other features and advantages of the present invention will be apparent from the description below.

BRIEF DESCRIPTION OF THE DRAWINGS

FIGS. 1 to 7 relate to a preferred exemplary embodiment of the present invention.

DETAILED DESCRIPTION OF THE PREFERRED EMBODIMENTS

Figure 1:
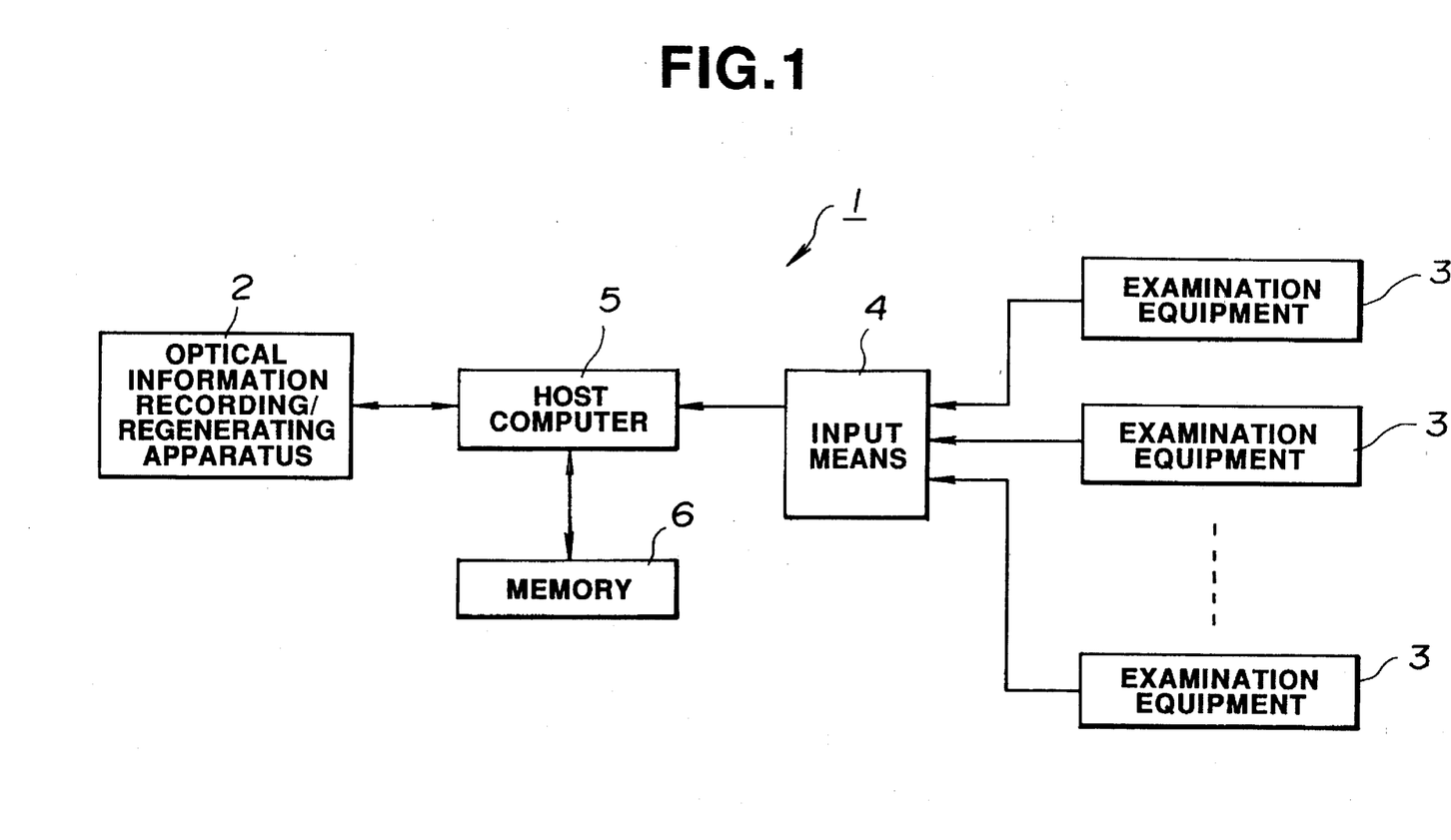
FIG. 1 shows a configuration of an optical information management system in which an information recording/regenerating method is implemented.

As shown in FIG. 1, an optical information management system 1 in which an information recording/regenerating method of this embodiment is implemented includes an optical information recording/regenerating apparatus 2 for recording or regenerating information on or from an optical card 10 to be described below. The system also includes multiple examination equipment 3 for use in examining, for example, a patient using multiple types of modalities, a host computer 5 for inputting the examination data sent from the multiple examination equipment 3 via an input means 4 and processing information, and a memory 6 for storing the examination data, on which the host computer 5 has performed signal processing, as screening files. The host computer 5 records or regenerates information on or from the optical card 10 according to an information recording/regenerating method to be described below, and manages examination data through the optical cards of individual patients.

Figure 6:
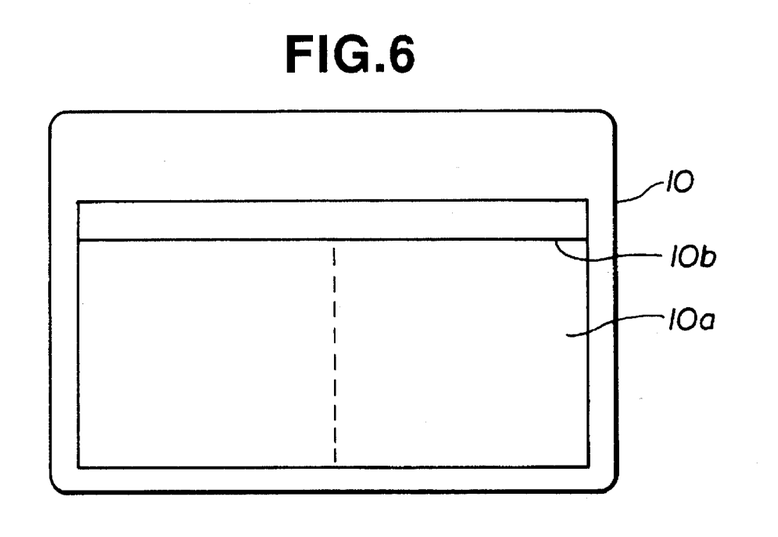
FIG. 6 shows a structure of an optical card serving as an information recording medium applicable to an information recording/regenerating method.

As shown in FIG. 6, an optical recording member 10a for optically recording information is formed on the surface of the optical card 10. The optical recording member 10a includes recording tracks 10b lined up in parallel with one another. Information recording is achieved by reciprocating the optical card 10 with respect to a recording head 11, which will be described below, and then, for example, optically piercing the tracks 10b. Information regenerating is achieved by reciprocating the optical card 10 with respect to a regenerating head 12, which will be described later, and then detecting holes recorded on the tracks 10b.

Figure 5:
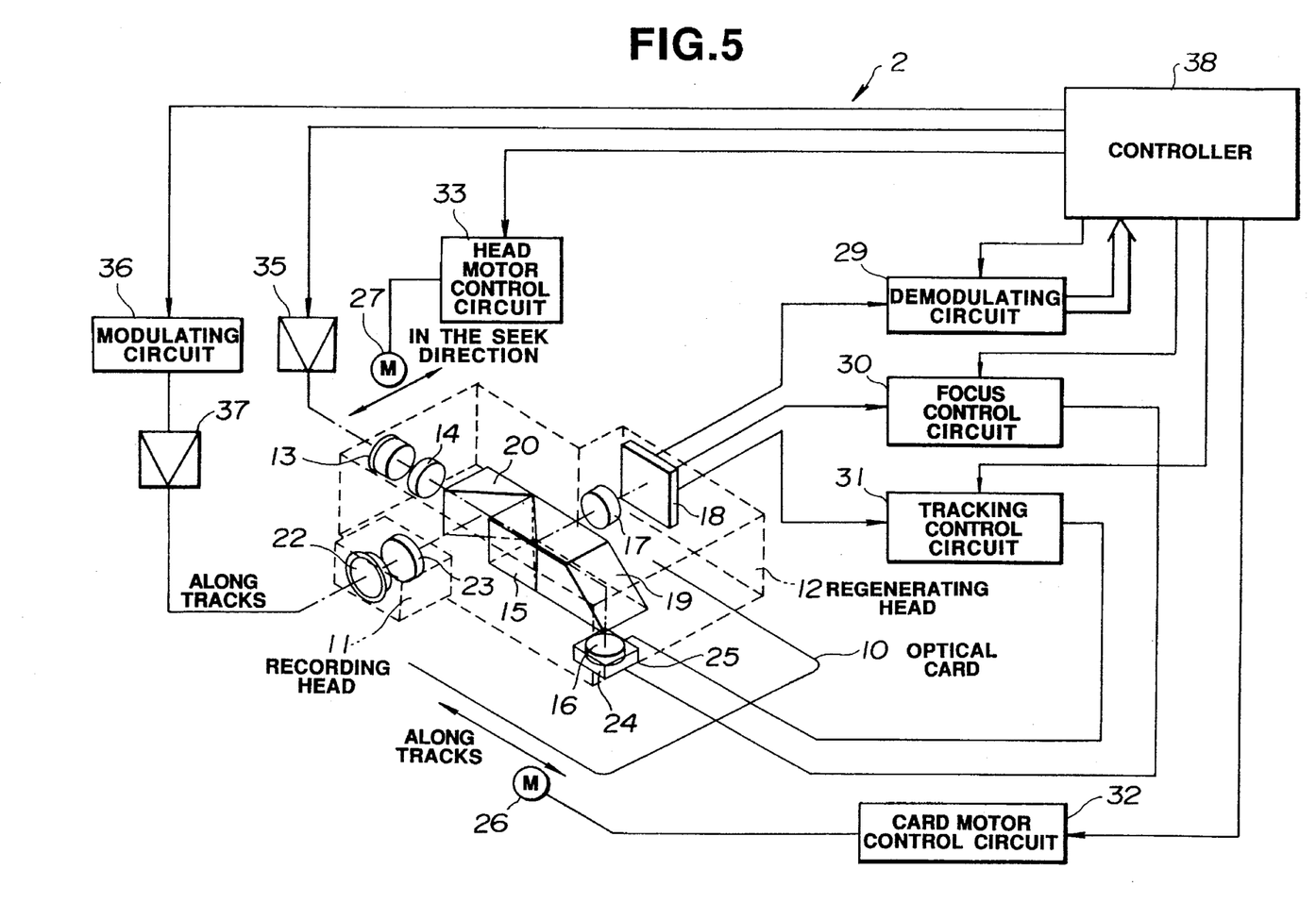
FIG. 5 shows a configuration of an optical information recording/regenerating apparatus in which an information recording/regenerating method is implemented.

In the optical information recording/regenerating apparatus 2 for recording or regenerating information on or from the optical card 10, as shown in FIG. 5, a semiconductor laser 22 in the recording head 11 is driven only for recording, while a light emitting diode (LED) 13 is driven for both recording and regenerating. The optical card 10 is driven along tracks (in the longitudinal direction thereof) by a card motor 26 under the control of a card motor control circuit 32, thus performing information recording. The regenerating head 12 is driven perpendicularly to tracks (in the seek direction) by a head motor 27 under the control of a head motor 1 control circuit 33, thus performing information regeneration.

Light originating from the LED 13 in the regenerating head 12 controlled by a drive circuit 35 is recomposed by a collimator lens 14 and becomes substantially parallel light. After transmitted by a dichroic mirror 20 and a half prism 15, the light is reflected by a reflecting prism 19. After passing through an objective lens 16, the reflected light is projected onto the optical card 10 to broadly illuminate the width of a track in the form of a spot. Light reflected from the optical card 10 is reflected by an objective lens 16, a reflecting prism 19, a half prism 15, and then received by a photodetector 18 via an image formation lens 17.

Light from the semiconductor laser 22 controlled by a modulating circuit 36 and a drive circuit 37 is recomposed by a collimator lens 23 and becomes substantially parallel light. The light is then reflected by the dichroic mirror 20, transmitted by the half prism 15, and then reflected by the reflecting prism 19. After passing through the objective lens 16, the reflected light is projected as a microscopic recording beam onto the optical card 10 within a region illuminated by the LED 13. The recording surface of the optical card 10 is thus physically changed (for example, pierced) to record information. The reflected light is received by the photodetector 18 via the objective lens 17, reflecting prism 19, half prism 15, and image formation lens 17.

The surface of the dichroic mirror 20 is provided with a specified coating so as to, for example, efficiently transmit the light originating from the LED 13 (having a wavelength of 860 nm) and efficiently reflect the light originating from the semiconductor laser 22 (having a wavelength of 780 mm).

A detected signal converted into an electrical signal by the photodetector 18 is fed to a demodulating circuit 29. The demodulating circuit 29 then outputs a read signal serving as a regenerative signal and a clock signal serving as a timing reference for recording or regenerating to a controller 38.

Part of the detected signal is also applied to a focus control circuit 30 and a tracking control circuit 31 which then produce a focus error signal and a tracking error signal. The focus error signal and tracking error signal are applied to a focus coil 24 and a tracking coil 25 in the regenerating head 12 via drive circuits (not shown). The objective lens 16 is then driven toward parting from or approaching to the optical card 10, or in the seek direction according to the error signals. Thus, auto-focus control and auto-tracking control are accomplished.

The controller 38 regenerates the information recorded on the optical card 10 according to the clock signal and read signal, and controls the control circuits in the apparatus, such as the modulating circuit 36, focus control circuit 30, and tracking control circuit 31 in order to record information sent from the host computer 5.

Assuming that the optical information management system 1 having the optical information recording/regenerating apparatus 2, which is configured as mentioned above, is used to perform screenings, for example, screenings sponsored by a municipality, if a health care advice is given to a person having the optical card 10, the stored data of the results of screenings the person has undergone are referenced to retrieve such materials as the situations under which the person has received screenings to date in the past and the time-series change in the results of received screenings.

Figure 7:
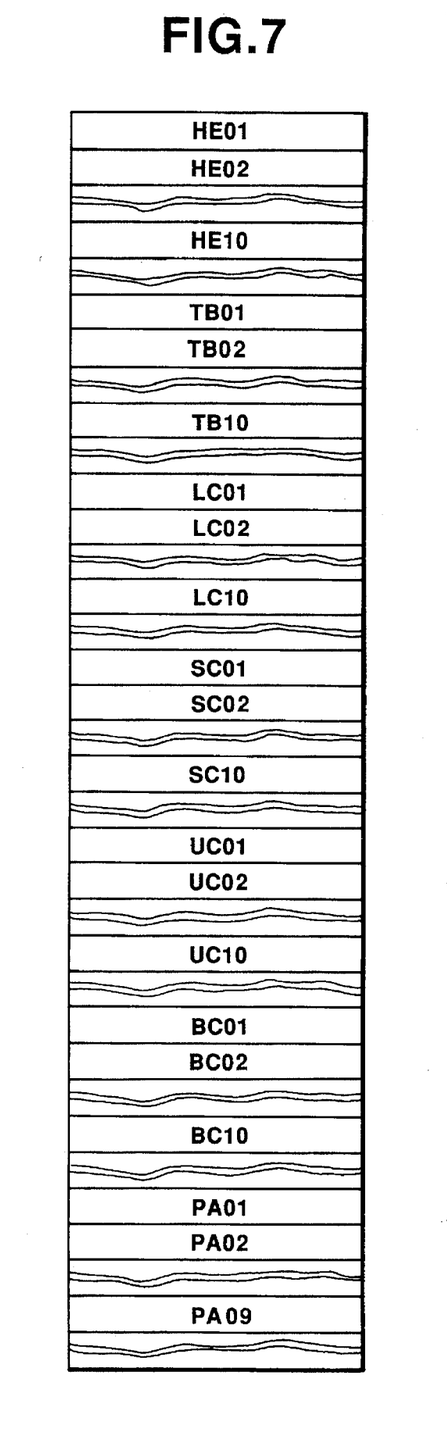
FIG. 7 is a conceptual diagram showing a state in which the results of screenings a person has undergone are recorded on an optical card.

FIG. 7 is a conceptual diagram showing a state in which the optical card 10 is used for recording screenings sponsored by a municipality, and the results of six types of screenings a person undergoes every year have been stored on the optical card 10 for the past ten years.

The results of each screening are stored on the optical card 10 in the form of a screening file at the time of screening every year. HE01 to HE10 denote screening files for basic physical checkups. TB01 to TB10 denote screening files for screenings of tuberculosis. LC01 to LC10 denote screening files for screenings of lung cancer. SC01 to SC10 denote screening files for screenings of stomach cancer. UC01 to UC10 denote screening files for screenings of uterine cancer. BC01 to BC10 denote screening files for screenings of breast cancer. The numerals written in the screening files denote years of screenings. The array of records in FIG. 7 is only an example. The array of records is not limited to the one in FIG. 7. The results of screenings may be recorded in the order in which a person has undergone the screenings.

PA01 to PA09 contain intra-period information. PA01 denotes a packed file constructed by reading the results of screenings for the year of 01 from the files HE01, TB01, LC01, SC01, UC01, and BC01, and uniting the read information. Similarly, PA02 to PA09 denote pack files constructed by reading the results of screenings for the associated years of 02 to 09 from the screening files HE02 to HE09, TB02 to TB09, LC02 to LC09, SC02 to SC09, UC02 to UC09, and BC02 to BC09, and uniting the read information.

The timing of creating a packed file is, for example, the turning of a year (when a file for a new year is written). The screening files for the old year are united to create a packed file. Assuming that a person did not receive all types of screenings, when a file for a new year is written, a packed file for the old year is created. When types of screenings a person underwent are revealed in advance, a packed file may be created not only according to the aforesaid timing but also at the time when the results of all the types of screenings have been written down on the screening files.

In FIG. 7, a rectangle representing each information item merely indicates the presence of the information item. The area of a rectangle does not indicate a quantity of information.

A method of recording screening files and packed files on the optical card 10 will be described using the flowchart of FIG. 2.

The host computer 5 receives recording data from the input means 4, and starts recording at a step S1. At a step S2, the host computer 5 processes examination data sent from multiple examination equipment 3, which are to be recorded, and then uses the optical information recording/regenerating apparatus 2 to search the optical card 10 for a screening file dated the same year as a screening file stored in the memory 6. It is determined at a step S3 whether a screening file dated the same year resides in the optical card 10. Herein, search for a screening file at the step S2 is achieved by reading file names and directory information of the files recorded at the recording start position on the optical card 10, and then checking if a file name consistent with the name of an intended screening file resides.

If it is found at the step S3 that a screening file dated the same year is present in the optical card 10. Control passes to a step S7, and a latest screening file Is recorded in the optical card 10. If a screening file dated the same year is absent from the optical card 10, control passes to a step S4. All screening files dated the year for which no pack file has been created are then regenerated from the optical card 10. It is determined at a step S5 whether the number of regenerated screening files exceeds 1. Herein, regenerating a screening file at the step S4 is achieved by reading information from an intended screening file.

When it is found at the step S5 that the number of regenerated screening files exceeds 1, control passes to a step S6. At the step S6, regenerated screening files are united as a packed file and recorded on the optical card 10. Control then passes to a step S7. A latest screening file is then recorded on the optical card 10. It is found at the step S5 that the number of regenerated screening files is less than 1, recording a packed file on the optical card 10 is not carried out. Control passes to the step S7. The latest screening file is then recorded on the optical card 10. Control then passes to a step S8. Recording then terminates.

Figure 2:
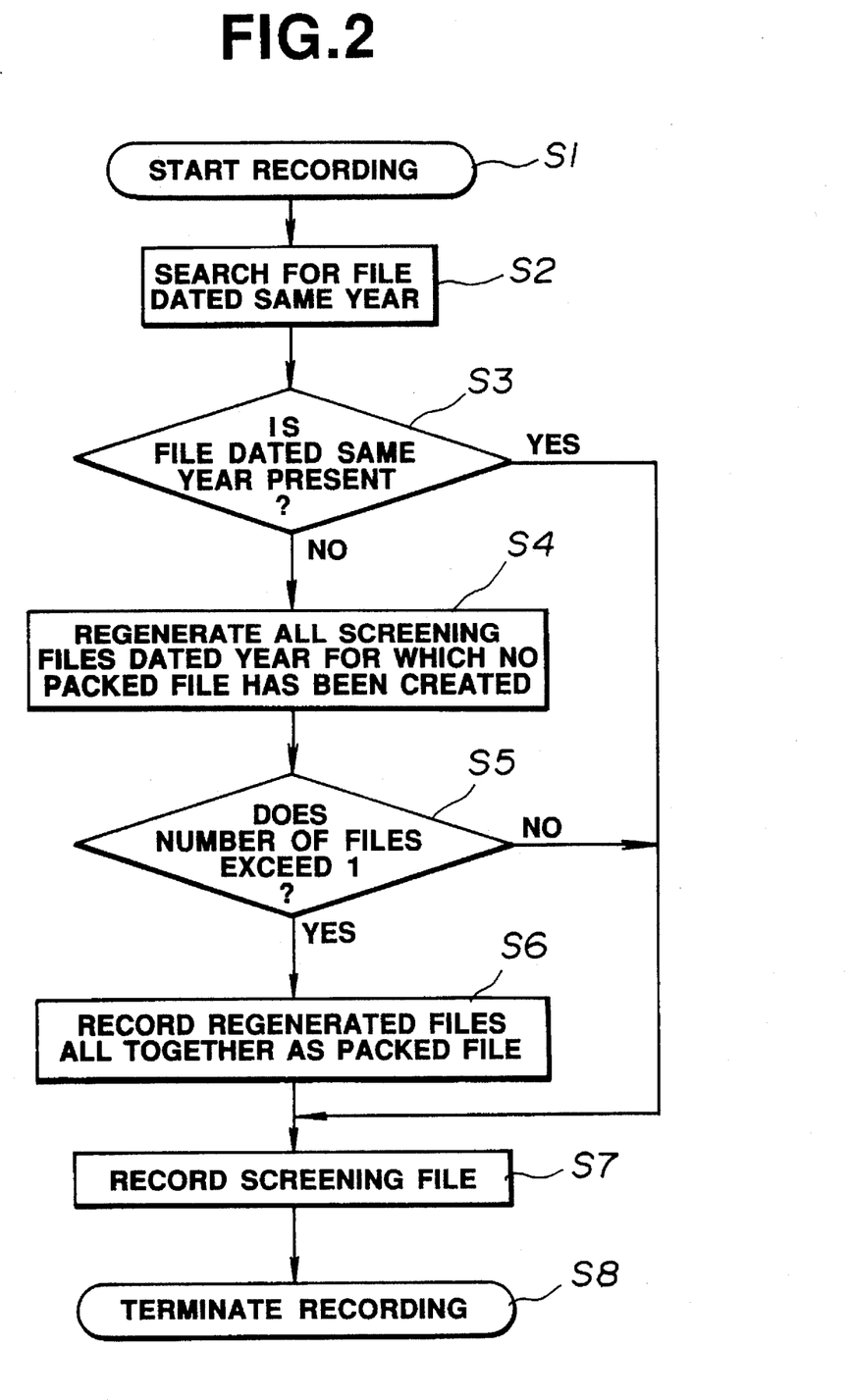
FIG. 2 is a flowchart showing a flow of an information recording method.

The state shown in FIG. 7 results from the recording according to the flowchart in FIG. 2. In FIG. 2, assuming that the results of a basic physical checkup for the year of 01 is recorded as a first file, the optical card 10 is searched for a file dated the same year as HE01 at the step S2. It is then determined at the step S3 whether a file dated the same year is present. Since this is an initial recording, a screening file dated the same year is absent. Control therefore passes to the step S4. All screening files dated the year for which no pack file has been created are regenerated from the optical card 10. It is determined at the step S5 whether the number of regenerated screening files exceeds 1. Since no screening file has been recorded, control passes to the step S7. The latest screening file HE01 is then recorded.

Next, the results of a screening of tuberculosis, TB01, will be recorded. Since the screening file dated the same year, that is, HE01 is present, control passes from the step S3 through S7. The latest screening file TB01 is then recorded.

Similarly, the results of a screening of lung cancer for the year of 01 are recorded as LC01, the results of a screening of stomach cancer are recorded as SC01, the results of a screening of uterine cancer are recorded as UC01, and then the results of a screening of breast cancer are recorded as BC01.

When the results of a basic physical checkup for the next year of 02 are recorded as HE02, a screening file dated the same year is absent. Control therefore passes from the step S3 through S4. The screening files HE01, TB01, LC01, UC01 and BC01 dated the year for which no packed file has been created are all regenerated. It is determined at the step S5 whether the number of regenerated screening files exceeds 1. Since the number of regenerated screening files exceeds 1, control passes to the step S6. At the step S6, all the regenerated screening files (screening files for the year of 01) are united as a packed file PA01, and recorded. Thereafter, the latest screening file HE02 is recorded at the step S7.

As for the results of a screening of tuberculosis, TB02, since HE02 has already been recorded and a screening file dated the same year Is therefore present, control passes from the step S3 through S7. At the step S7, the latest screening file TB02 is recorded.

Similarly, the results of a screening of lung cancer for the year of 02 are recorded as LC02, the results of a screening of stomach cancer are recorded as SC02, the results of a screening of uterine cancer are recorded as UC02, and then the results of a screening of breast cancer are recorded as BC02.

Similarly, pack flies PA02 to PA09 for the years of 02 to 10, as well as HE10, TB10, LC10, SC10, UC10, and BC10 are recorded.

Figure 3:
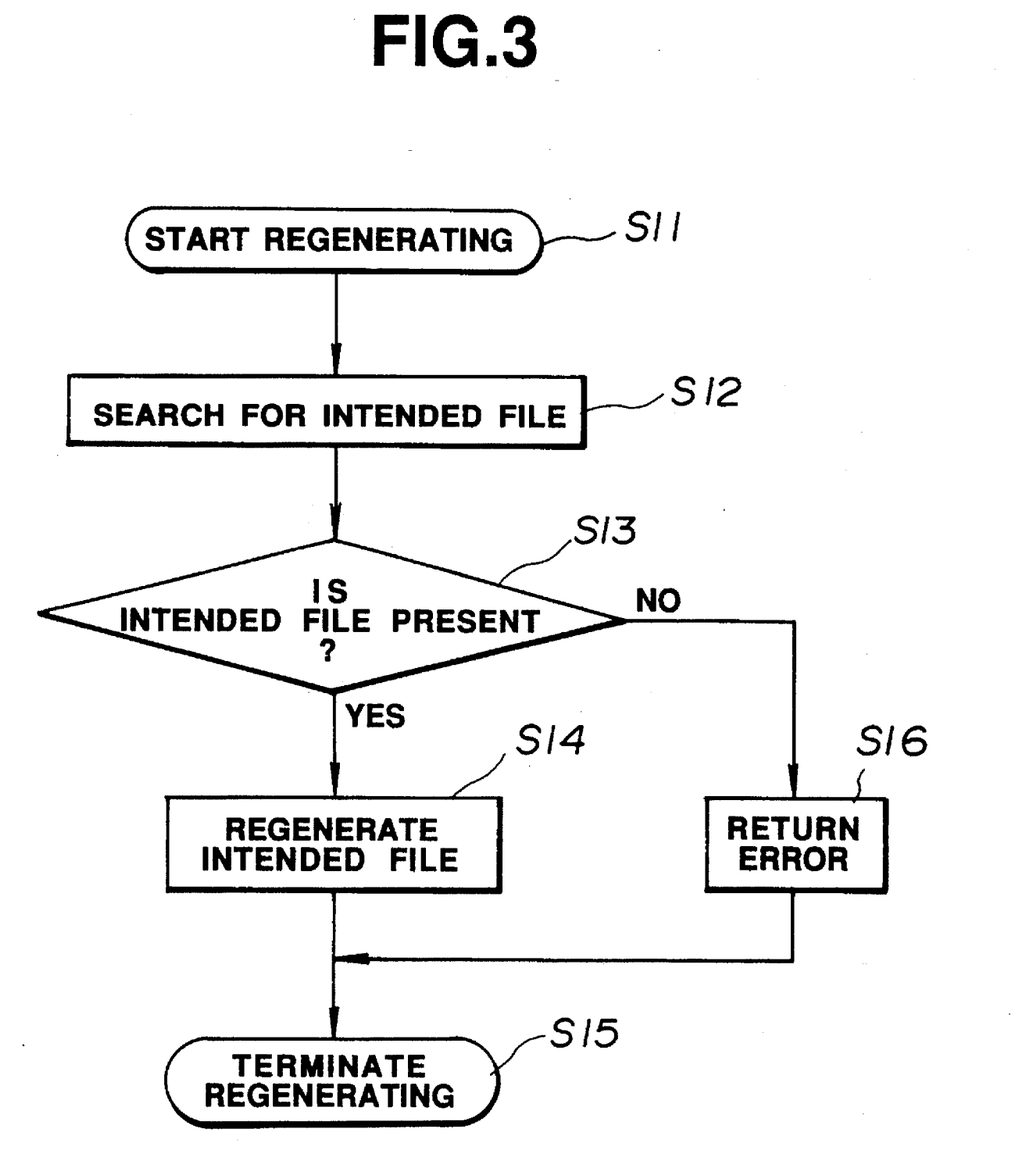
FIG. 3 is a flowchart showing a regenerating method for regenerating the information of a specific file.

A method of regenerating a specific desired screening file from among the screening files thus recorded on the optical card 10 will be described using the flowchart in FIG. 3.

The host computer 5 starts regenerating at a step S11, searches the optical card 10 for an intended specific screening file using the optical information recording/regenerating apparatus 2 at a step S12, and determines at a step S13 whether the intended screening file resides in the optical card 10. If it is found at the step S13 that the intended screening file resides in the optical card 10, control passes to a step S14. The intended screening file is regenerated at the step S14. Control then passes to a step S15, and processing terminates. If it is found at the step S13 that the intended specific screening file does not reside on the optical card 10, control passes to a step S16. An error is returned to an operator (for example, an error message is displayed on a monitor which is not shown). Control then passes to the step S15, and processing terminates.

Figure 4:
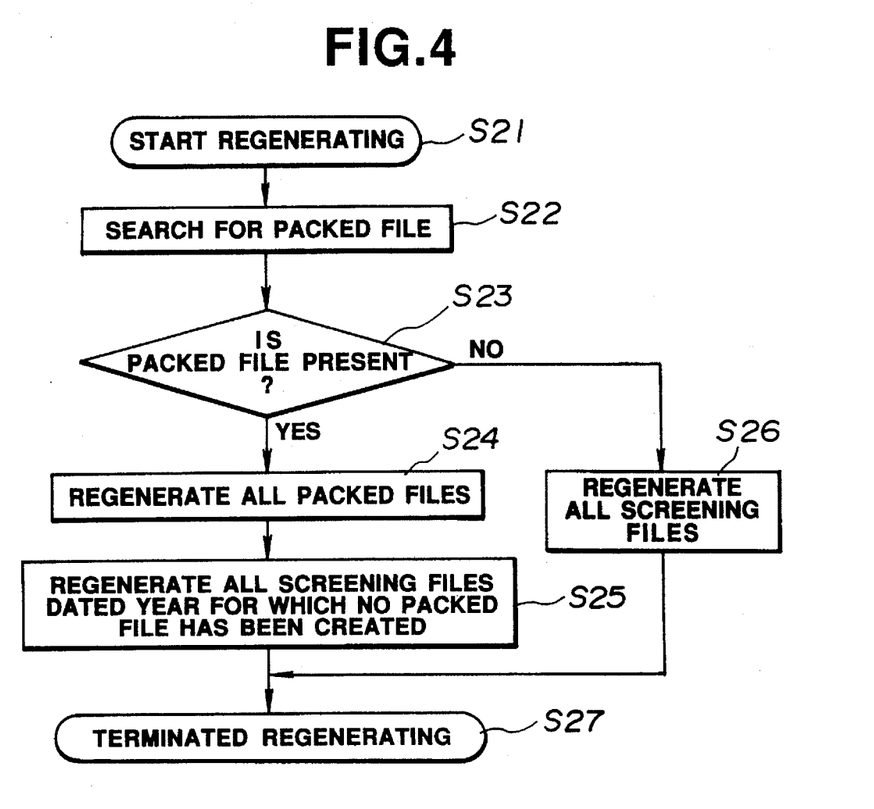
FIG. 4 is a flowchart showing a flow of an information regenerating method.

Next, a method of regenerating all the recorded items of information will be described using the flowchart in FIG. 4.

The host computer 5 starts regenerating at a step S21, searches the optical card 10 for a packed file using the optical information recording/regenerating apparatus 2 at a step S22, and then determines at a step S23 whether a packed file is present. Search for a packed file at the step S22 is achieved, similarly to the operation at the step S2 In FIG. 2, by reading file names and directory information of the files recorded at the recording start position on the optical card 10, and checking if a file name consistent with the name of an intended packed file resides in the optical card 10. A file having a file name which starts with characters PA is searched for.

If it is found at the step S23 that a packed file is present, control passes to a step S24. At the step S24, all pack files are regenerated from the optical card 10. At a step S25, all screening files dated the year for which no packed file has been created are regenerated from the optical card 10. Control then passes to a step S27. If it is found at the step S23 that a packed file is absent, control passes to a step S26. All screening files are then regenerated from the optical card 10. Control then passes to the step S27, and then regenerating terminates.

A method of regenerating the results of all screenings in FIG. 7 from the optical card 10 will be described specifically in conjunction with the flowchart in FIG. 4.

First, the optical card 10 is searched for a packed file at the step S22. It is determined at the step S23 whether a packed file is present. Since packed files PA01 to PA09 are present, all the packed files are regenerated from the optical card 10 at the step S24. Next, at the step S25, the screening files HE10, TB10, LC10, SC10, UC10, and BC10 dated the year for which no packed file has been created are all regenerated from the optical card 10.

Assuming that the information of the results of screenings is recorded being united on a yearly basis, nine packed files PA01 to PA09, and six non-packed files HE10, TB10, LC10, SC10, UC10, and BC10, totaling 15 files, must be regenerated in order to acquire all the information.

If the results of screenings are not stored as packed files on a yearly basis, time for carrying out a regenerating procedure, that is, time for sending an intended file name and a file regenerating command to the optical information recording/regenerating apparatus 2 is required to regenerate a file for each of all the files or sixty files. The larger the number of files, the greater the time needed for regenerating information.

In this embodiment, when the information already recorded is to be regenerated, information regeneration is achieved by regenerating information recorded all together instead of sequentially regenerating multiple items of information recorded independently. This helps improve the information regenerating efficiency per time required for regenerating.

Using this embodiment, a procedure for regenerating information need not be repeated for 60 files but may be repeated for only 15 files. The number of repetitions has thus decreased drastically. Compared with a prior art, this embodiment can provide desired information before long.

Assuming that the recording format of the employed optical card 10 is 1024 bytes per track and the file record length is 1024 bytes, even if a quantity of the information of a file to be recorded is one byte long, one track consisting of 1024 bytes is occupied. If the quantity of information of each file is always 1024 bytes long, the number of tracks will not change before and after screening files are packed. However, in the situation where some of screening files are less than 1024 bytes long, when the screening files are united and recorded as a packed file, the number of record tracks decreases. To be more specific, for example, when the HE10 file is 2000 bytes long and the UC10 file is 40 bytes long, two tracks are needed to record the HE10 file and one track is needed to record the UC10 file. Consequently, a total of three tracks are needed. When the HE10 and UC10 files are united to create a packed file PA10, the PA10 file becomes 2040 bytes long. Only two tracks are needed for recording. One track is thus obviated. When multiple screening flies are packed, the number of tracks can be decreased with the quantity of information unchanged. This leads to a decrease in the time for accessing a track in which required information is recorded. Consequently, the time for regenerating information is reduced.

Information is duplexed, that is, recorded both in a screening file and in a packed file. If the information in either a screening file or a packed file should become unusable for regenerating, the other information can be used for regenerating to provide required information. This improves the reliability of the information.

In the aforesaid embodiment, information to be recorded represents the results of screenings. The information to which the present invention can apply is not limited to the above information, but may be information of the history of failure and repair of goods, or any other information. In the aforesaid embodiment, information is united on a yearly basis. Alternatively, information may be united on a monthly, weekly, daily, or hourly basis.

An information recording method according to the embodiment can apply to a magnetic tape, a magnetic disk, an optical disk, a magneto-optic disk, an optical card, an IC card, or any other information recording medium.

In the present invention, it will be apparent that a wide range of different embodiments can be formed on the basis of the invention without departing from the spirit or scope of the invention. This invention is limited to the appended claims but not restricted to any specific embodiments.

What is claimed is:

1. An information recording/regenerating method, comprising:

a first step at which input information provided by an information input means is recorded on an information recording medium;

a second step at which record information is regenerated from said recording medium on which said input information is recorded; and a third step at which said record information which has been regenerated at said second step and recorded within a specified period is recorded as intra-period information on said information recording medium.

2. An information recording/regenerating method according to claim 1, further comprising a fourth step at which said input information recorded at said first step and said intra-period information recorded at said third step are regenerated.

3. An information recording/regenerating method according to claim 1 or 2, wherein said input information is at least one item of information of a plurality of types.

4. An information recording/regenerating method according to claim 3, wherein when said record information within said specified period consists of said plurality of items of information of a plurality of types, said record information within said specified period is recorded as said intra-period information on said information recording medium at said third step.

5. An information recording/regenerating method according to claim 3, wherein when said input information is newly-recorded on said information recording medium at said first step, said record information within said specified period is recorded as said intra-period information on said information recording medium at said third step.

6. An information recording/regenerating method according to claim 3, wherein said input information or said record information includes period information, and when said period information of said input information differs from said period information of said record information within said specified period, said record information within said specified period is recorded as said intra-period information on said information recording medium at said third step.

7. An information recording/regenerating method according to claim 1 or 2, wherein said information recording medium is an optical card.

8. An information management system in which the information recording/regenerating method according to claim 1 is implemented, comprising:

an input means for inputting at least one item of input information of a plurality of types;

a recording means for recording said input information on an information recording medium;

a regenerating means for regenerating record information recorded on said recording medium; and a period information recording means that when said record information recorded on said recording medium within a specified period consists of a plurality of items of information, records said record information as intra-period information on said recording medium.

9. An information management system according to claim 8, wherein when said recording means records said input information on said information recording medium, said period information recording means records said record information within said specified period as said intra-period information on said information recording medium.

10. An information management system according to claim 8, wherein said input information and said record information include period information, and when said period information of said input information differs from said period information of said record information within said specified period, said period information recording means records said record information within said specified period as said intra-period information on said information recording medium.

11. An information management system according to any of claims 8, 9, and 10, wherein said information recording medium is an optical card.

12. An information recording/regenerating method, comprising:

a first step at which first input information including period information is input;

a second step at which said period information included in second information, which has been classified into a plurality of types according to the contents thereof, is regenerated from an information recording medium on which said second information is recorded in areas allocated by said classified types;

a third step at which it is determined whether said period information provided at said first step is consistent with said period information provided at said second step; and a fourth step at which when it is determined at said third step that said period information provided at said first and second steps is inconsistent with each other, items of information in said second information which are the same as said period information are recorded altogether in an area different from said areas allocated by said classified types.

13. An information recording/regenerating method according to claim 8, further comprising a fifth step at which when it is determined at said third step that said period information provided at said first and second steps is consistent with each other, said first information is recorded in an area on said information recording medium which is allocated according to the contents thereof; and a sixth step at which even when it is determined at said third step that said period information provided at said first and second steps is inconsistent with each other, said first information is recorded in an area on said information recording medium which is allocated according to the contents thereof, after said second information is recorded at said fourth step.

14. An information recording/regenerating method according to claim 12, wherein recording said second information at said fourth step is performed only when said period information is consistent In a plurality of items of said second information.

15. An information recording/regenerating method according to claim 8, wherein items of information in said second information which are the same as said period information which have already been recorded altogether is not recorded at the fourth step.

16. An information recording/regenerating method according to claim 12, wherein said period information represents a period within which said first information and said second information are recorded respectively on said information recording medium.

17. An information recording/regenerating method according to any of claim 12, 13, 14, 15, and 16, wherein said information recording medium is an optical card.

18. An information management system in which the information recording/regenerating method according to claim 8 is implemented, comprising:

an input means for inputting first input information including said period information;

a regenerating means that regenerates said period information included in second information, which has been classified into a plurality of types according to the contents thereof, from an information recording medium on which said second information is recorded in areas allocated by said classified types;

a determining means that determines whether said period information provided by said input means is consistent with said period information provided by said regenerating means; and a recording means that when said determining means determines that said period information provided in said first input information and said second information is inconsistent with each other, records items of information included in said second information which are the same as said period information altogether in an area different from the areas allocated by said classified types.

19. An information management system according to claim 18, further comprising a first recording means that when said determining means determines that said period information is consistent with each other, records said first information in an area on said information recording medium which is allocated according to the contents thereof; and a second recording means that when it is determined at said third step that said period information is inconsistent with each other, after said recording means records said second information, records said first information in an area on said information recording medium which is allocated according to the contents thereof.

20. An information management system according to claim 18, wherein said recording means records said second information only when said period information is consistent in a plurality of items of information in said second information.

21. An information management system according to claim 18, wherein said recording means does not record items of information included in said second information which are the same as said period information but which has already been recorded altogether.

22. An information management system according to claim 18, wherein said period information represents a period within which said first information and said second information are recorded respectively in said information recording medium.

23. An information management system according to any of claims 18, 19, 20, 21, and 22, wherein said information recording medium is an optical card.

* * * * *